(12) United States Patent
Bourdoux et al.

(10) Patent No.: US 11,641,303 B2
(45) Date of Patent: May 2, 2023

(54) SYSTEM AND METHOD FOR PERFORMING ORTHOGONAL FREQUENCY-DIVISION MULTIPLEXING (OFDM) BASED RADAR DETECTION

(71) Applicant: IMEC vzw, Leuven (BE)

(72) Inventors: Andre Bourdoux, Theux (BE); Marc Bauduin, Brussels (BE); Claude Desset, Heusy (BE)

(73) Assignee: IMEC vzw, Leuven (BE)

( * ) Notice: Subject to any disclaimer, the term of this patent is extended or adjusted under 35 U.S.C. 154(b) by 674 days.

(21) Appl. No.: 16/578,156

(22) Filed: Sep. 20, 2019

(65) Prior Publication Data

US 2020/0124700 A1  Apr. 23, 2020

(30) Foreign Application Priority Data

Sep. 22, 2018 (EP) .................................. 18196127

(51) Int. Cl.
*H04L 27/36* (2006.01)
*G01S 7/03* (2006.01)
*H04L 5/00* (2006.01)
*H04L 27/26* (2006.01)

(52) U.S. Cl.
CPC .............. *H04L 27/364* (2013.01); *G01S 7/03* (2013.01); *H04L 5/001* (2013.01); *H04L 27/2613* (2013.01); *H04L 27/2614* (2013.01)

(58) Field of Classification Search
CPC ..... G01S 7/03; H04L 27/364; H04L 27/2613; H04L 5/001; H04L 27/2614
See application file for complete search history.

(56) References Cited

U.S. PATENT DOCUMENTS

| | | | |
|---|---|---|---|
| 8,441,393 B2 * | 5/2013 | Strauch | G01S 13/288 342/60 |
| 8,681,885 B2 * | 3/2014 | Chung | H04L 27/0014 375/316 |
| 2008/0219339 A1 | 9/2008 | Chrabieh et al. | |
| 2017/0264477 A1 * | 9/2017 | Qu | H04L 27/2637 |

FOREIGN PATENT DOCUMENTS

| | | |
|---|---|---|
| CN | 107147596 A | 9/2017 |
| WO | WO 2009/056627 A2 | 5/2009 |
| WO | WO 2010/056204 A2 | 5/2010 |

OTHER PUBLICATIONS

Gupta, S., Shankar Mishra, R., & Nema, R. (2011). PAPR Reduction in OFDM Via Separation of Complex Baseband Signal. International Journal of Computer Applications, 16(4), 44-48. doi: 10.5120/1997-2693 (Year: 2011).*

(Continued)

*Primary Examiner* — Bernarr E Gregory
*Assistant Examiner* — Oladimeji Oyegunle
(74) *Attorney, Agent, or Firm* — Knobbe, Martens, Olson & Bear, LLP

(57) ABSTRACT

An orthogonal frequency-division multiplexing (OFDM) based radar signal comprising Q sub-carriers adapted to push an IQ-imbalance component out of a subset of L contiguous range bins of range profiles derived out of the received radar signal and wherein L is at most Q/2, is disclosed.

15 Claims, 4 Drawing Sheets

(56) References Cited

OTHER PUBLICATIONS

Bourdoux Andre et al: "IQ Imbalance Robust OFDM Radar Waveform", 2018 15th European Radar Conference (EURAD), European Microwave Association, Aug. 11, 2018, pp. 297-300, XP033453487, DOI: 10.23919/EURAD.2018.8546643.

Cun Feng Gu et al. "Time domain IQ imbalance compensation for wideband wireless systems", IEEE Communications Letters, IEEE Service Center, Piscataway, NJ, US, vol. 14, No. 6, Jun. 1, 2010, pp. 539-541, XP011310525, ISSN: 1089-7798.

Davis et al. "Peak-to-Mean Power Control in OFDM, Golay Complementary Sequences, and Reed-Muller Codes", IEEE Transactions on Information Theory, vol. 45, No. 7, Nov. 1999, pp. 2397-2417.

Lopez-Estraviz et al. "Optimal Training Sequences for Joint Channel and Frequency-Dependent IQ Imbalance Estimation in OFDM-based Receivers", Interuniversity Micro-Electronics Center (IMEC) Wireless Research Group, 2006.

Lopez-Estraviz et al. "Pilot design for Joint Channel and Frequency-Dependent Transmit/Receive IQ Imbalance Estimation and Compensation in OFDM-based Transceivers", Interuniversity Micro-Electronics Center (IMEC) Wireless Research Group, 2007.

Manasseh et al. "Training Symbol Design for Channel Estimation and IQ Imbalance Compensation in OFDM Systems", Dept. of Artificial Complex Systems Engineering, Hiroshima University, 2012.

Sun, Kexuan, "Optimal Pilot based Frequency-dependent I/Q Imbalance Compensation for Wideband Direct-Conversion Transceivers", University College London.

Windisch et al. "Preamble Design for an Efficient I/Q Imbalance Compensation in OFDM Direct-Conversion Receivers" Vodafone Chair Mobile Communications Systems, Technische Universitat Dresden.

Extended European Search Report dated Mar. 13, 2019 EP Application No. 18196127.7.

* cited by examiner

SYSTEM AND METHOD FOR PERFORMING ORTHOGONAL FREQUENCY-DIVISION MULTIPLEXING (OFDM) BASED RADAR DETECTION

CROSS-REFERENCE TO RELATED APPLICATIONS

This application claims foreign priority to EP 18196127.7, filed Sep. 22, 2018 and titled "OFDM BASED RADAR DETECTION", the content of which is incorporated by reference herein in its entirety.

BACKGROUND

Field

Example embodiments relate to orthogonal frequency-division multiplexing, OFDM, based radar signals, methods for generating such radar signals and to a radar for transmission and reception of such radar signals.

Description of the Related Technology

Orthogonal frequency-division multiplexing (OFDM) is a technique where information is multiplexed onto a multitude of subcarriers or tones. OFDM has proven to be very effective for wideband wireless and wired data communication and is widely used for digital television and audio broadcasting, subscriber-line based internet access, wireless area networks, power line networks, and 4G mobile communications.

In recent years, OFDM has also been proposed for radar detection as it can provide highly desired features such as spectrum-shaping, the use of multiple access schemes (OFDMA) and dynamic spectrum management. In an OFDM radar transmit chain a predefined frequency domain, FD, sequence is mapped onto the set of subcarriers resulting in a FD radar signal. The FD signal is then converted to the time domain, TD, upconverted onto a carrier frequency within the radar spectrum band and repeatedly transmitted as TD radar signals. In an OFDM radar receive chain the received TD radar signals are downconverted to baseband (DC) and converted back to the frequency domain. By using the known transmitted sequence, a range profile is constructed conveying range information of one or more objects within the detection range of the radar. Furthermore, from the range bins of such set of range profiles, a Doppler profile may be derived conveying information on the speed of the detected objects. The output resulting from the combination of the range and Doppler profiles is typically referred to as a range-Doppler map.

SUMMARY OF CERTAIN INVENTIVE ASPECTS

However, just as OFDM based data communication, also OFDM based radar detection may suffer from front-end non-idealities such as IQ imbalance originating from the analogue quadrature receiver, i.e. different distortion between the in-phase and quadrature portions of the received radar signal. Moreover, the IQ imbalance will manifest in both the range and Doppler profiles. Due to the different nature of these profiles, solutions for overcoming IQ imbalance in wireless communication systems cannot be applied one-to-one onto OFDM radar detection systems.

Amongst others, it is an object of the disclosed technology to overcome the above identified problem and to foresee in a solution for OFDM based radar detection that is robust to IQ imbalance.

This object is achieved, according to a first aspect of the present disclosure, by an orthogonal frequency-division multiplexing, OFDM, based radar signal comprising Q sub-carriers adapted to push an IQ-imbalance component out of a subset of L contiguous range bins of range profiles derived out of the received radar signal; and where L is at most Q/2.

The radar signal may be represented in the frequency domain by a sequence of Q in-phase (I) and quadrature (Q) values, by an in-phase and quadrature time domain baseband symbol, either digital or analogue, or by a time domain symbol upconverted to a carrier frequency within a radar band of interest. As shown by example embodiments, it is possible to construct a radar signal that will push out IQ-imbalance out of L contiguous range bins of the range profiles. In other words, when limiting the range bins to L≤Q/2 upon constructing the range-Doppler map, neither the Doppler profile nor the range profiles will be affected by the IQ-imbalance of a direct conversion receiver or the IQ-imbalance will at least be greatly reduced. Hence, a radar signal according to the first aspect is characterized by the absence of a reduced IQ-imbalance component in the derived range-Doppler map when taking L≤Q/2. Radar signals according to the first aspect may be constructed in various ways as will be illustrated by the example embodiments.

It is thus an advantage that by the radar signal according to the first aspect, a radar system can be obtained that is robust to IQ-imbalance by merely adapting the signal itself. This further has the advantage that less stringent IQ-imbalance requirements can be imposed on the direct conversion receiver of a radar. All in all, this leads to a much simpler, more efficient and less expensive radar system.

For constructing the range profile may for example correspond to a matched filter range profile, a zero-forcing range profile, or a mean minimum square error range profile may be used. Also, other linear or non-linear range profile estimators may be used.

According to an example embodiment, the OFDM based radar signal is robust to IQ-imbalance when a Hadamard product of:
i) an inverse or complex conjugate transpose of a sequence of the Q sub-carriers represented in the frequency domain, the FD sequence, and
ii) a complex conjugate of the FD sequence where the order of subcarriers of the FD sequence is reversed,
is orthogonal to the 2L−1 subcarriers centred around the direct current, DC, subcarrier of a Fourier transformation matrix indicative for the relation between the time domain, TD, and FD representation of the OFDM radar signal.

In other words, when the sequence of subcarriers is selected according to the above properties, then the radar signal will be robust to IQ-imbalance when selecting the L≤Q/2 range bins out of the received signal. As the properties only relate to the sequence itself, the radar signal will be independent on other characteristics of the radar system or on variable characteristics such as the wireless channel. Hence, it is always possible to form a predefined sequence of radar signals that are robust IQ-imbalance.

According to an example embodiment, L equals Q/2 and the Hadamard product corresponds to a sequence of a same complex scalar constant with alternating sign.

According to an example embodiment, the FD sequence for L=Q/2 will correspond to this Hadamard product when the FD sequence corresponds to a complex scalar constant multiplied by an intermediate FD sequence fulfilling the following conditions:
a) the direct current, DC, subcarrier and the highest frequency subcarrier of the FD sequence are real;
b) mirror subcarriers have equal magnitudes; and
c) the sum of the phases of mirror subcarriers is 180 degrees for odd subcarriers and 0 degrees for even subcarriers.

In other words, the maximum of range bins Q/2 may be obtained when selecting the FD sequence according to these conditions. This thus results in the most optimal use of the frequency spectrum and, hence, an optimal range and velocity range.

Advantageously, the intermediate FD sequence further fulfils the condition that d) the positive subcarriers have equal magnitudes. In such a case, the IQ imbalance will further be cancelled out for both a zero forcing range profile and matched filter range profile.

According to a further embodiment, OFDM based radar signal has a Peak-to-Average Power Ratio, PAPR of at most two.

As shown by example embodiments, within the radar signals according to the first aspect, there always exists a radar signal with a Peak-to-Average Power Ratio, PAPR of at most two. It is an advantage that by achieving a low PAPR the power amplifier's back-off requirements can be relaxed and the power amplifier may work closer to its saturation point thereby increasing the detection range and improving the amplifier's power efficiency The positive or negative subcarriers of the intermediate FD sequence may then further correspond to a Golay sequence. In other words, to select a sequence with a PAPR of at most two, the intermediate FD sequence may be further characterized by a Golay sequence.

A second aspect of the disclosed technology relates to a method for generating the radar signal according to the first aspect. The method comprises the step of providing a sequence of Q frequency domain, FD, OFDM sub carriers such that a Hadamard product of i) an inverse or complex conjugate transpose of a sequence of the Q sub-carriers represented in the frequency domain, the FD sequence, and ii) a complex conjugate of the FD sequence where the order of subcarriers of the FD sequence is reversed, is orthogonal to the 2L−1 subcarriers centred around the direct current, DC, subcarrier of a Fourier transformation matrix indicative for the relation between the time domain, TD, and FD representation of the OFDM radar signal; and the step of transforming the sequence from the frequency domain to the time domain based on the Fourier transformation matrix thereby obtaining the radar signal.

According to example embodiments of the method L=Q/2 and the FD sequence further corresponds to a complex scalar constant multiplied by an intermediate FD sequence fulfilling the following conditions:
a) the direct current, DC, subcarrier and the highest frequency subcarrier of the FD sequence are real;
b) mirror subcarriers have equal magnitudes; and
c) the sum of the phases of mirror subcarriers is 180 degrees for odd subcarriers and 0 degrees for even subcarriers.

According to further example embodiments of the method, the method further comprises providing Golay sequences as candidates for the positive or negative subcarriers of the intermediate FD sequence; deriving therefrom candidate FD sequences by applying the conditions b) and c); and selecting from the candidates a selected FD sequence with an optimal PAPR.

According to a third aspect, the disclosed technology relates to a radar configured to generate the TD radar signal according to the first aspect and/or to perform the method according to the second aspect.

According to example embodiments, the radar is further configured to receive the radar signal; to transform the received radar signal to the FD thereby obtaining the Q subcarriers; and to derive from the Q subcarriers a range bin with L elements.

According to example embodiments, the radar is a multiple-input and multiple-output, MIMO, radar.

BRIEF DESCRIPTION OF THE DRAWINGS

Some example embodiments will now be described with reference to the accompanying drawings.

DETAILED DESCRIPTION OF CERTAIN ILLUSTRATIVE EMBODIMENTS

The following notational conventions are used in the below description: vectors and matrices are denoted by a single and double under-bar respectively ($\underline{a}$ and $\underline{\underline{A}}$); the superscript * is used to indicate the complex conjugate (a*); the superscripts $^T$ and $^H$ denote the matrix transpose and complex conjugate transpose respectively ($\underline{\underline{A}}^T$ and $\underline{\underline{A}}^H$). $\underline{\underline{D}}(.)$ is a diagonal operator such that $\underline{\underline{D}}(\underline{a})$ is a diagonal matrix whose diagonal is equal to $\underline{a}$ and $\underline{d}(.)$ is a diagonal operator such that $\underline{d}(\underline{\underline{A}})$ is a vector containing the diagonal of matrix $\underline{\underline{A}}$; frequency domain, FD, variables are represented with a tilde (ã); a full size Fourier transformation matrix is denoted as $\underline{\underline{F}}$ and a partial Fourier transformation matrix with K rows and L columns is denoted as $\underline{\underline{F}}_{KL}$; the Hadamard or element-wise product of two vectors is denoted as $\underline{a} \odot \underline{b}$; $\underline{\underline{I}}_L$ is an identity matrix of size L.

Figure 1:
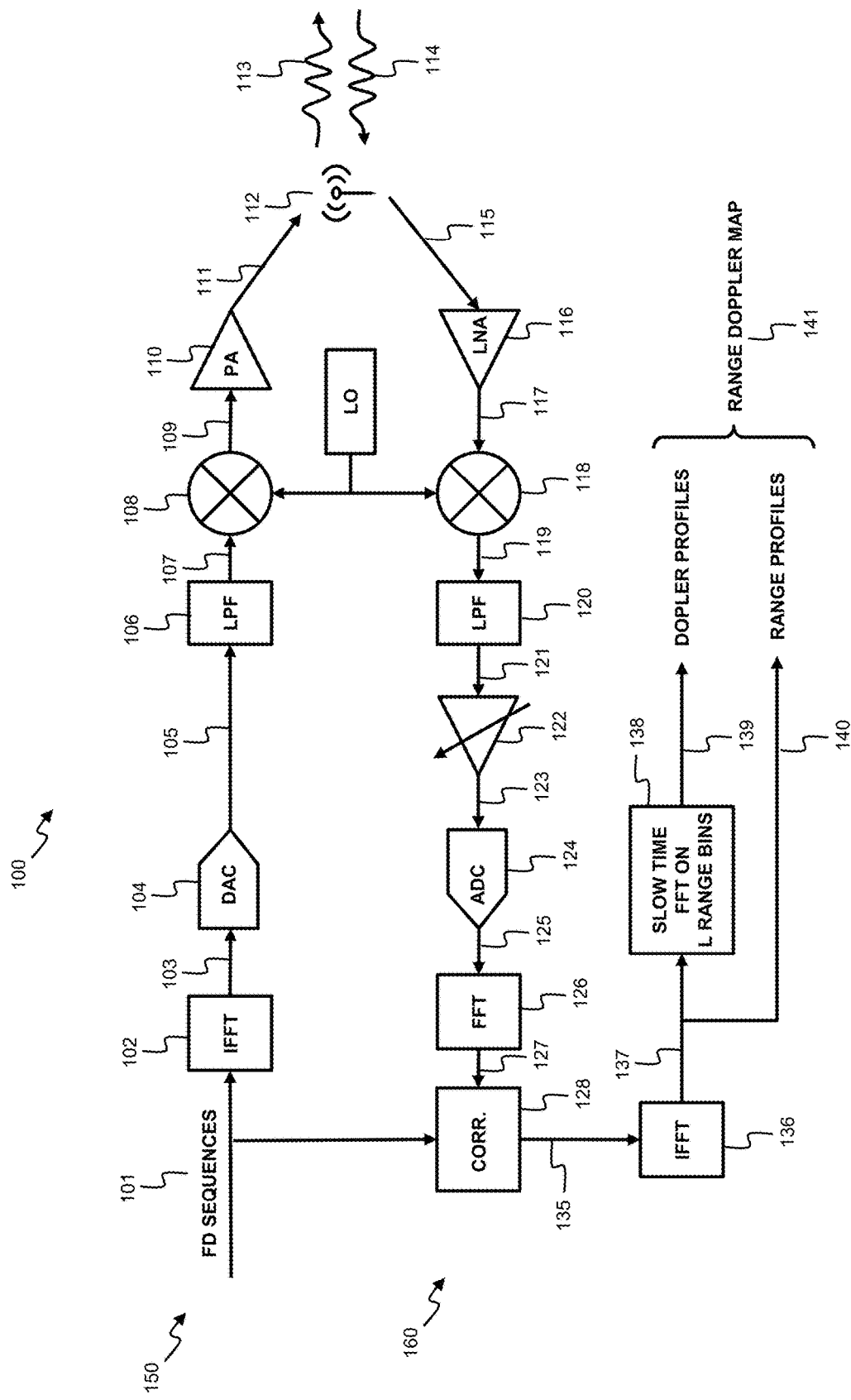
FIG. 1 shows a radar according to an example embodiment.
Figure 2:
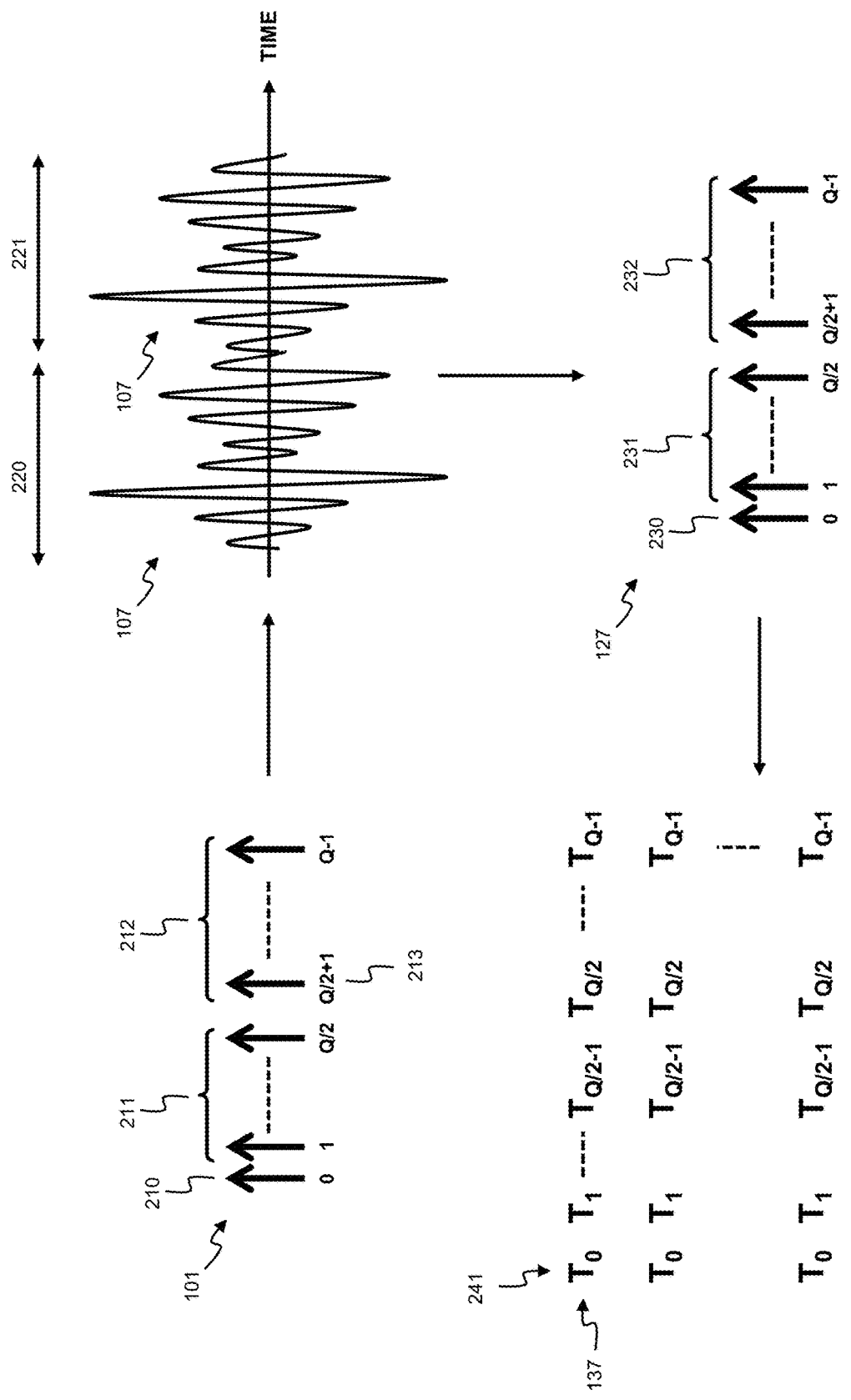
FIG. 2 shows a radar signal used by the radar according to an example embodiment.

FIG. 1 shows a block diagram of an OFDM based radar 100 for the detection of the speed and range of remote objects by transmitting OFDM based radar signals 113 and receiving the reflected radar signals 114. To this respect, radar 100 comprises a transmit chain 150 for generating and transmitting the radar signals 113 and a receive chain 160 for receiving the reflected radar signals 114 deriving therefrom range and Doppler profiles 139, 140. Radar 100 will further be described with reference to FIG. 2 showing different representations 101, 107, 127, 137 of the radar signals within the different stages of the transmit and receive chains 150, 160. Radar 100 initiates a radar transmission from a sequence 101 of in-phase and quadrature, I and Q, values of the Q subcarriers of the OFDM radar signal. In this disclosure, sequence 101 is represented by a vector $\underline{\tilde{s}}$ with subcarrier indices $q \in \{0,Q-1\}$ where index 0 (FIG. 2, 210) corresponds to the DC subcarrier, indices $\in \{1,Q/2\}$ (FIG. 2, 211) correspond to the positive side, i.e., the subcarriers above carrier frequency, and elements $\in \{Q/2+1,Q-1\}$ (FIG. 2, 212) correspond to the negative side (the subcarriers below the carrier frequency). Radar 100 is further configured to perform an inverse Fourier transform, IFFT, on the sequence 101 by a circuitry 102 and to obtain a digital time domain symbol representation 103 of the radar signal of duration T (220, 221). Radar 100 further comprises a digital-to-analogue converter, DAC, 104 for converting the digital radar signal 103 into an analogue time domain symbol representation 105 with duration T. Radar 100 may further comprise a low-pass filter, LPF, circuit 106 for filtering out higher frequency components from the radar signal 105 to obtain the filtered radar signal 107. Radar 100 further comprises a mixer 108 for converting the radar signal 107 up to a carrier frequency F0 thereby obtaining a radar signal 109 within an appropriate radar frequency band. Radar 100 further comprises a power amplifier, PA, 110 for amplifying the radar signal 109 to an amplified radar signal 111 which, on its turn, is transmitted as a wireless radar signal 113 by an antenna 112. Radar 100 is further configured to repeatedly transmit the radar signals 113. As the sequence is a repetition 220, 221 of the same time domain symbol 107, there is no need to insert a cyclic prefix in between each repetition for avoiding intersymbolic interference, ISI.

A portion of the transmitted radar signal 113 will reflect onto an encountered object as a reflected radar signal 114. The radar 100 is configured to receive this reflected radar signal 114 by the antenna 112. Similar to the transmit chain 150, the receive chain 160 comprises a low-noise amplifier 116, a direct conversion mixer 118 and a low pass filter 120 for respectively amplifying the radar signal 115 to an amplified received radar signal 117, down mixing this amplified radar signal 117 to a baseband radar signal 119, and low pass filtering of the baseband radar signal 119 to a filtered baseband radar signal 121. Radar 100 further comprises an amplifier 122 with an adjustable gain for matching of the filtered signal 121 to the input of the analogue to digital converter, ADC, 124. This converter 124 converts the received analogue radar signal 123 to a digital discrete version 125 of the radar signal. The receive chain 160 further comprises circuitry 126 for performing a Fourier transform of the radar signal 125 to the frequency domain, i.e., to derive in-phase and quadrature, I and Q, values of the Q subcarriers 230, 231, 232 of the OFDM radar signal. In the frequency domain, the received Q subcarriers 127 are further processed in block 128 by an element-wise operation with the known transmitted sequence 101. This may for example be done by a zero-forcing, ZF, matched filter, MF, a simple ZF or a minimum mean square error, MMSE, estimator. The result of the correlation is then converted back to the time domain by performing an inverse Fourier transformation in block 136 thereby obtaining a range profile $\underline{p}_L$ 137, i.e. a range profile using L range bins 241 from the total of Q subcarriers. Analytically, the range profile $\underline{p}_L$ 136 of a received radar signal $\underline{r}$ 125 may be obtained by configuring the receive chain 160 as follows:

$$\underline{p}_L^{MF} = \underline{F}_{KL}^H \underline{D}(\underline{\tilde{s}}_K)^H \underline{E}_{KQ} \underline{r}$$ (Eq. 1)

$$\underline{p}_L^{ZF} = (\underline{F}_{KL}^H \underline{D}(\underline{\tilde{s}}_K)^H \underline{D}(\underline{\tilde{s}}_K) \underline{F}_{KL})^{-1} \underline{p}_L^{MF}$$ (Eq. 2)

$$\underline{p}_L^{ZF,simple} = \underline{F}_{KL}^H \underline{D}(\underline{\tilde{s}}_K)^{-1} \underline{E}_{KQ} \underline{r}$$ (Eq. 3)

$$\underline{p}_L^{MMSE} = (\underline{F}_{KL}^H \underline{D}(\underline{\tilde{s}}_K)^H \underline{D}(\underline{\tilde{s}}_K) \underline{F}_{KL} + \sigma_n^2/Q_L)^{-1} \cdot F_{KL}^H \underline{D}(\underline{\tilde{s}}_K)^H \underline{E}_{KQ} \underline{r}$$ (Eq. 4)

where:
$\underline{p}_L^{MF}$ is the range profile 137 using a matched filter;
$\underline{p}_L^{ZF}$ is the range profile 137 using zero forcing;
$\underline{p}_L^{ZF,simple}$ is the range profile 137 using simplified zero forcing;
$\underline{p}_L^{MMSE}$ is the range profile 137 using minimum mean square error;
a subset of K sub-carriers is used out of the Q subcarriers;
only L number (240) of range bins (241) are reconstructed out of the full-length range profile;
the L reconstructed range bins (240) are contiguous;
the covered range (240) of L range bins may start at any position;
L is at most Q/2;
$\underline{r}$ is the received time domain radar signal 125; and
$\sigma_n$ is an estimate of the receiver's noise variance.

The above range profile estimators are all linear estimators. Other estimators may be applied to the receive chain 160 as long as only L (240) range bins 241 are reconstructed out of the full-length range profile 137 and L is at most Q/2. All multiplications with partial Fourier matrices $\underline{E}_{KL}$ or $\underline{E}_{KL}^H$ in the above linear range profile estimators may be implemented with classical full FFTs by either forcing inputs to zero or discarding outputs, as relevant.

The range profiles 137 are further repeatedly derived for each received repeated symbol 220, 221 thereby obtaining a set of range profiles. From this set, radar 100 derives a set of Doppler profiles 139 by performing a further Fourier transform 138 on the L range bins 240 of the set of range profiles.

Radar 100 is further configured to select the input sequence 101 such that an introduced IQ-imbalance originating from the direct conversion mixer 118 between the in-phase and quadrature values of the Q subcarriers affects the radar detection minimally, i.e., the IQ-imbalance does not show up in the derived Doppler profiles 139 or the derived range profiles 140. Analytically, this may be done by selecting the FD sequence $\underline{\tilde{s}}$ 101 such that the IQ imbalance component in the range profiles is cancelled or minimized.

For the zero forcing range profile $\underline{p}_L^{ZF}$ the unwanted IQ imbalance component $\underline{X}_{IQ}$ corresponds to:

$$\underline{X}_{IQ} = \beta \underline{F}^H \underline{D}(\underline{\tilde{s}})^{-1} \underline{P} \underline{D}(\underline{\tilde{s}})^* \underline{\tilde{h}}^*$$

where:
$\underline{X}_{IQ}$ is the IQ-imbalance component in the zero forcing range profile $\underline{p}_L^{ZF}$;
$\beta$ is the imbalance in the quadrature branch of the receive signal;
$\underline{\tilde{h}}$ is the channel response;
$\underline{P}$ is a permutation matrix reversing the order of the subcarriers, i.e., for a column vector $\underline{x} = [1\ 2\ 3\ \ldots\ Q]^T$, $\underline{P}\underline{x} = [1\ Q\ Q-1\ \ldots\ 2]^T$.

From this, it may be derived that $\underline{X}_{IQ}$ will be cancelled when finding a sequence $\underline{\tilde{s}}$ for which the expression:

$$\underline{d}(\underline{D}(\underline{\tilde{s}})^{-1} \underline{P} \underline{D}(\underline{\tilde{s}})^* \underline{P}) = \underline{\tilde{s}}^{-1} \odot (\underline{P}\underline{\tilde{s}}^*)$$ (Eq. 5a)

is orthogonal to the Fourier transformation matrix $\underline{F}^H$.

Similarly, for the matched filter range profile $\underline{p}_L^{MF}$ the unwanted IQ imbalance component $\underline{X}_{IQ}$ corresponds to:

$$\underline{X}_{IQ} = \beta \underline{F}^H \underline{D}(\underline{\tilde{s}})^H \underline{P} \underline{D}(\underline{\tilde{s}})^* \underline{\tilde{h}}^*$$

From this, it may derived that $\underline{X}_{IQ}$ will be cancelled when finding a sequence $\underline{\tilde{s}}$ for which the expression:

$$\underline{d}(\underline{D}(\underline{\tilde{s}})^H \underline{PD}(\underline{\tilde{s}})^* \underline{P}) = \underline{\tilde{s}}^H \odot (\underline{P\tilde{s}}^*) \quad \text{(Eq. 5b)}$$

is orthogonal to the Fourier transformation matrix $\underline{F}^H$.

The criteria under Eq. 5a or 5b cannot be fulfilled when considering the complete range profiles, i.e., when trying to cancel the IQ imbalance in all range bins of the range profiles. However, $\underline{X}_{IQ}$ can be cancelled when only considering $L \leq Q/2$ contiguous subcarriers 240 out of the Q subcarriers. In such a case a sequence $\underline{\tilde{s}}$ exists such that Eq. 5a or Eq. 5b is orthogonal to the 2L-1 subcarriers centred around the direct current, DC, subcarrier of the Fourier transformation matrix $\underline{F}^H$. In this case, the IQ imbalance will be pushed out of the set of L range bins of the considered range profile. Furthermore, for the simple zero forcing range profile $p_L^{ZF,simple}$ and MMSE range profile $p_L^{MMSE}$, it has been observed that the IQ imbalance is also pushed out of the L range bins, but not to the full extent resulting in a reduced IQ imbalance distortion in the considered L range bins.

Preferably, L=Q/2 because this results in the largest range coverage. In this case, Eq. 5a may be simplified by finding the sequence $\underline{\tilde{s}}$ such that:

$$\underline{\tilde{s}}^{-1} \odot (\underline{P\tilde{s}}^*) = \underline{v}; \text{ where } \underline{v} = [1, -1, 1, -1, \ldots, -1].$$

In this case, $\underline{\tilde{s}}$ may be constructed as follows:
1) the first element 210 of $\underline{\tilde{s}}$ is real, i.e. the direct current, DC, subcarrier (210) of the FD sequence 101 is real;
2) The amplitude and phases of the elements on the positive side 211 of the spectrum can take any value, e.g. they may have a unit or random magnitude, their phase may be zero or any random value;
3) The magnitudes of the elements on the negative side 212 satisfy the condition that $|\tilde{s}(q)|=|\tilde{s}(Q-q)|$ or, in other words, mirror subcarriers have equal magnitudes;
4) The phases of the elements on the negative side 212 satisfy the condition that $\angle \tilde{s}(q) + \angle \tilde{s}(Q-q) = q\pi$ or, in other words, the sum of the phases of mirror subcarriers 211, 212 is 180 degrees for odd subcarriers and 0 degrees for even subcarriers.
5) The (Q/2+1)-th element of $\underline{s}$ must be real or, in other words, the highest frequency subcarrier (213) of the FD sequence 101 is real;
6) The resulting solution from 1) to 5) may further be scaled by any complex scalar constant.

Preferably, the positive subcarriers further have equal magnitudes because in this case the constructed sequence $\underline{\tilde{s}}$ will also comply with equation 5b resulting in a sequence that cancels the IQ-balance for both zero-forcing and matched filter derived range profiles.

When using a sequence $\underline{\tilde{s}}$ 101 obtained from the above conditions 1) to 6), the range profile 137 may be obtained by any of the above range profile equations (Eq. 4) where K=Q and L=Q/2. For each of these range profiles the IQ-imbalance component will at least partially be pushed out of the L considered range bins. As there are a plurality of solutions for $\underline{\tilde{s}}$, other optimization criteria may be imposed as described below. The obtained sequence $\underline{\tilde{s}}$ is further compatible with sub-carrier loading, i.e. with the assigning of different powers to the different sub-carriers. This may be desirable for spectrum shaping, for cognitive radar applications or other radar design requirements.

According to an embodiment, the additional degree of freedom may further be exploited to minimize the peak-to-average-power-ratio, PAPR. Achieving a low PAPR is crucial in wireless and radar transmissions since it relaxes the power amplifier's 110 back-off requirements and allows working closer to saturation thereby increasing the detection range and improving the PA's 110 power efficiency. The PAPR expressed in dB of the discrete-time TD radar signal 103 represented by $\underline{t}$ is:

$$PAPR_{dB} = 10\log_{10}\left(\frac{\max|t|^2}{1/Q \underline{t}^H \underline{t}}\right). \quad \text{(Eq. 6)}$$

The radar system 100 may be operated by the repeated transmission of the same OFDM radar signal 113. The PAPR may therefore be determined by a single OFDM radar symbol. The PAPR of an OFDM symbol may be as high as $10 \log_{10}(Q)$. To reduce PAPR, Golay complementary FD symbols may be used to guarantee an upper bound of 2 (3 dB), regardless of the OFDM symbol size Q. An additional advantage of such Golay sequences is that their elements have a unit magnitude such the MF range profile is identical to the ZF range profile thereby achieving zero range sidelobes. A problem with Golay sequences is that they do not fulfil the condition of (Eq. 5) for an OFDM radar signal that is robust to IQ imbalance.

In order to overcome this problem and, thus, to jointly suppress the interference due to IQ imbalance and achieve a low PAPR, the FD sequence 101 may be designed as follows. First a length Q/2 Golay sequence is constructed and mapped to the positive side 211 of the sub-carriers 101. The negative side 212 is then derived from the positive side by applying the constraint of (Eq. 5) or the above procedure 1) to 6) resulting in a length Q FD sequence 101. The Golay sequence may for example be constructed by the following recursive procedure to:

$$A_0(n) = \delta(n);$$

$$B_0(n) = \delta(n);$$

$$A_k(n) = W_k A_{k-1}(n) + B_{k-1}(n - D_k);$$

$$B_k(n) = W_k A_{k-1}(n) - B_{k-1}(n - D_k); \quad \text{(Eq. 7)}$$

where:
the sequence has a length $M = 2^m$;
$A_k(n)$ and $B_k(n)$ are zero for $n < 0$ and for $n > 2^m$;
weights $W_k$ have a range from $\{-1, 1\}$; and
delays $D_k$ are selected as a permutation of $\{1, 2, 4, \ldots, 2^m\}$.

There are $2^m$ possible weights and m! possible delay combinations resulting in a total number $2^m m!$ of Golay complementary pairs of length $M = 2^m$.

At least one of the $2^m m!$ possible sequences 101 will have a PAPR of 2 or less. More specifically, when using real Golay sequences, a sequence 101 may be obtained with a PAPR of exactly 2. When using complex Golay sequences obtained by a counter clockwise $\pi/2$ rotation of real Golay sequences, a sequence 101 can be obtained with a PAPR lower than 2. In other words, by performing an exhaustive search over the possible Golay based sequences, a sequence 101 can be selected which is robust to IQ-imbalance and has a PAPR of 2 or less. For example, when Q=256, there are 645120 Golay sequences and for Q=512, there are 10321920 Golay sequences.

Figure 4:
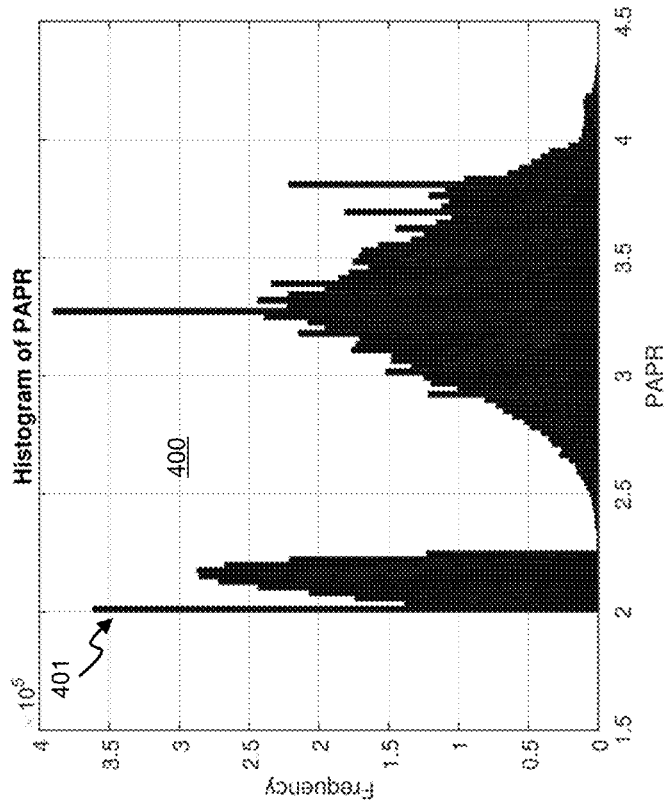
FIG. 4 shows a histogram of peak-to-average-ratios of radar signals according to another example embodiment.
Figure 3:
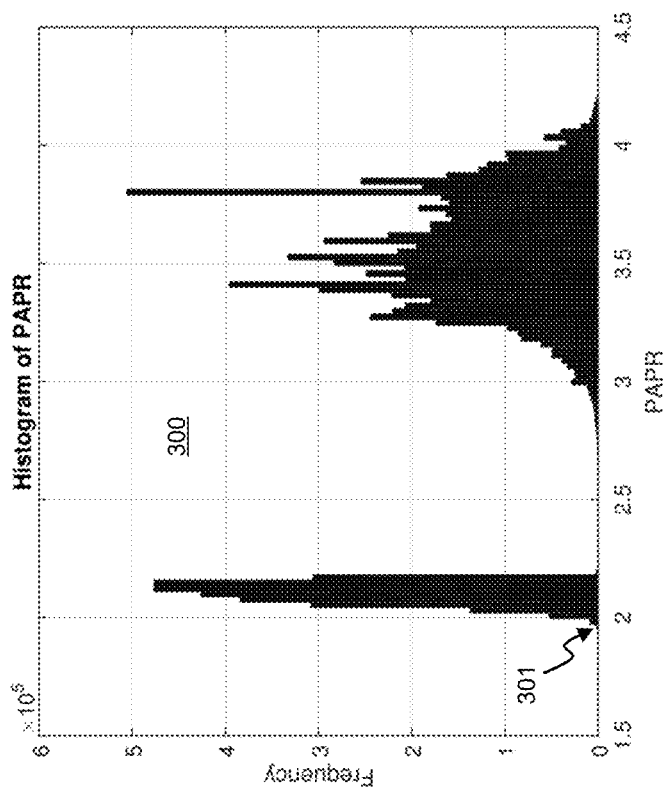
FIG. 3 shows a histogram of peak-to-average-ratios of radar signals according to an example embodiment.
Figure 6:
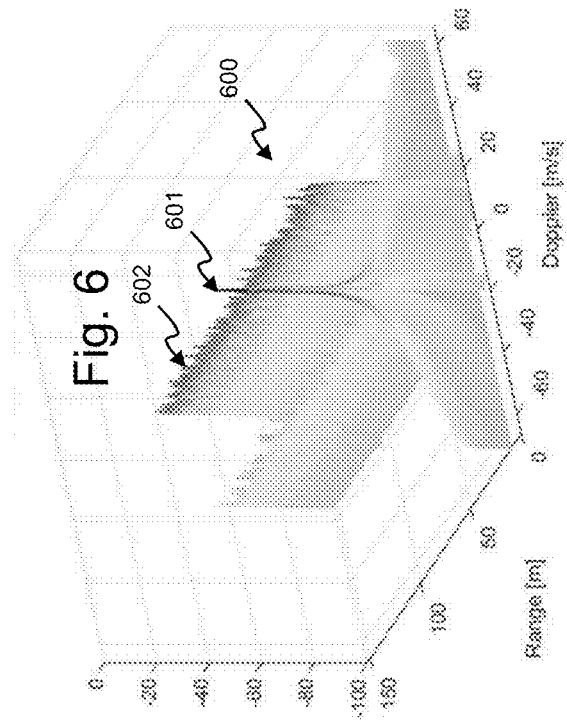
FIG. 6 illustrates a range-Doppler map of a received random radar signal by a radar with IQ-imbalance.
Figure 8:
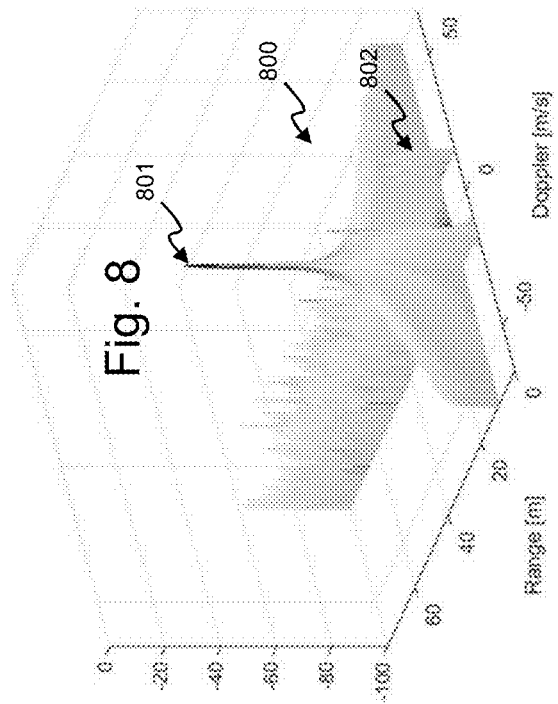
FIG. 8 illustrates the range-Doppler map of FIG. 7 limited to the L=Q/2 range bins.
Figure 5:
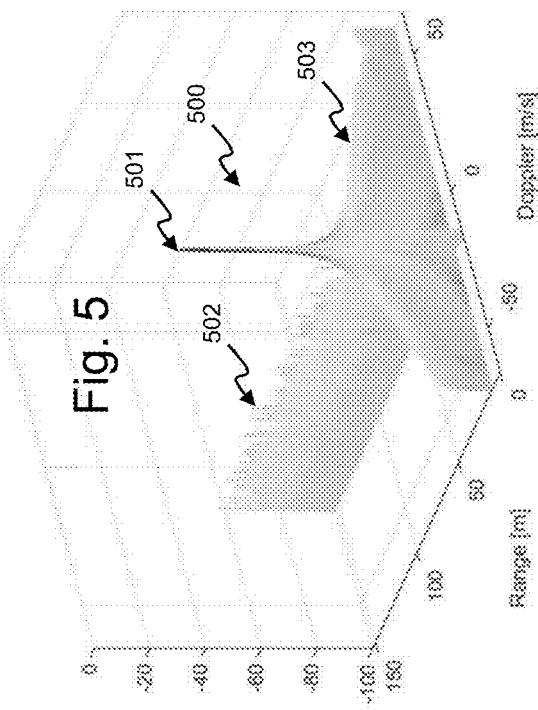
FIG. 5 illustrates a range-Doppler map of a received random radar signal by a radar without IQ-imbalance.
Figure 7:
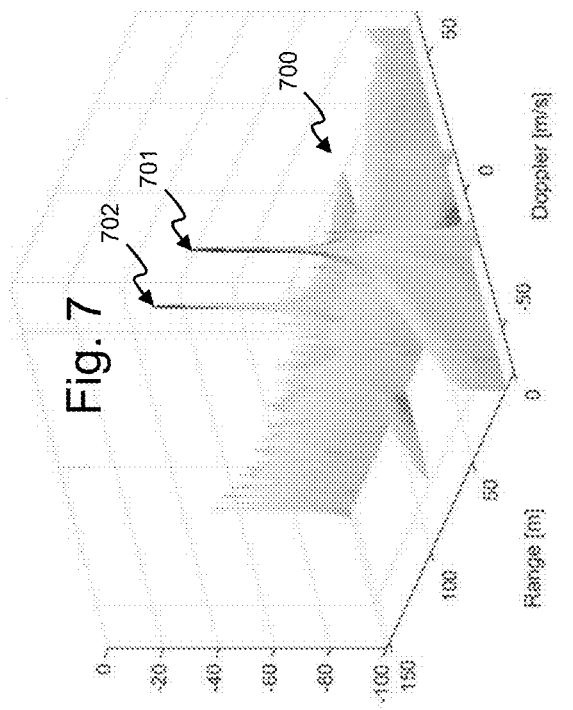
FIG. 7 illustrates a range-Doppler map of a received radar signal adapted to cancel out an IQ-imbalance component in L=Q/2 range bins.

FIG. 3 shows a histogram 300 of the obtained PAPR on the X-axis for sequences 101 with length Q=512 when using complex Golay sequences. From the histogram, it can be observed 301 that a sequence with a PAPR smaller than 2 can be obtained. FIG. 4 shows a histogram 400 of the obtained PAPR on the X-axis for sequences 101 with length Q=512 when using complex Golay sequences. From the histogram, it can be observed 401 that a sequence with a PAPR equal to 2 can be obtained.

FIG. 3 to FIG. 6 illustrate respective range-Doppler maps 300, 400, 500, 600 obtained by a simulation of the radar system 100 with the parameters as provided in Table 1 below where the first column describes the used applicable parameter, the second column shows the symbol for the respective parameter and the third column its respective value:

TABLE 1 parameters of simulated radar system

| | | |
|---|---|---|
| Carrier frequency | $F_0$ | 79 GHz |
| Bandwidth | B | 0.5 GHz |
| Number of sub-carriers (Range FFT size) | Q | 512 |
| Number of OFDM symbols (Doppler FFT size) | N | 512 |
| Range window | | Hamming |
| Reduced number of range bins | L | 256 |
| Doppler window | | Blackman |
| Range resolution | $R_{res}$ | 30 cm |
| Ambiguous range | $R_{amb}$ | 153.9 m |
| Velocity resolution | $v_{res}$ | 0.9 km/h |
| Ambiguous velocity | $v_{amb}$ | 238.4 km/h |
| Target position | | 10 m |
| Target velocity | | 15 m/s |
| IQ Phase mismatch (For FIG. 4, 5 and 6) | $\Delta\phi$ | ±10° |
| IQ Amplitude mismatch (For FIG. 4, 5 and 6) | ε | ±10% |

These parameters correspond to a typical automotive Medium Range Radar (MRR) scenario in the 79 GHz band. The ambiguous and resolution range and velocity were computed using the following equations:

$$R_{res} = \frac{c}{2B} \quad (\text{Eq. 8})$$

$$R_{amb} = \frac{cQ}{2B} = \frac{c}{2\Delta F} \quad (\text{Eq. 9})$$

$$v_{res} = \frac{cB}{2F_0 QN} \quad (\text{Eq. 10})$$

$$v_{amb} = \pm\frac{c}{4TF_0} = \pm\frac{cB}{4QF_0} \quad (\text{Eq. 11})$$

Where $\Delta F=1/T$; T is the OFDM symbol duration.

Range-Doppler map 500 illustrates an ideal case without IQ-imbalance, i.e. $\Delta\phi=0$ and $\varepsilon=0$, where the radar signal is based on a random complex waveform, drawn from a quadrature phase shift keying, QPSK, alphabet. There is a small ridge 502 along the range dimension between −50 and −60 dB which is a degradation of the range sidelobes due to the velocity of the object. There are also some sidelobes 503 along the Doppler dimension due to the combined effect of the Doppler shift and the applied windowing. The detected range and velocity of the object is clearly visible as peak 501.

Range-Doppler map 600 illustrates the same case of map 500 but with an added IQ-imbalance of $\Delta\phi=\pm10°$ and $\varepsilon=\pm10\%$. The map 600 shows a strong interference "ridge" 602 visible at a velocity opposite to the target velocity of the object. This interference 602 appears as a ridge 602 over all range bins because, using a random sequence for the radar signal spreads the energy over all the range bins. The interference 602 may thus jeopardize the correct detection of the object's peak 601 or trigger a false detection.

Range-Doppler maps 700 and 800 illustrates the case of map 600 but where the random QPSK based sequence is replace with a waveform optimized for both IQ-imbalance suppression and low PAPR as described according to the above embodiments. In map 700, the interference 702 due to the IQ imbalance is still visible but has been pushed beyond half of the range bins. As the design constraints imply that L=Q/2=256, only half of the range profile is used. The IQ distortion 702 is thus pushed from the L first range bins to the last L range bins that are discarded. Range-Doppler map 800 illustrates the same case 700 but with the last L range bins discarded, i.e. only the first L=256 range bins are shown. The remaining interference 802 due to the IQ imbalance is almost 70 dB below the target power and, hence, negligible.

The above radar system 100 has been described as a single input single output, SISO, system. The principle of IQ-imbalance compensation and PAPR reduction according to the above embodiment, may also be equally applied to radars that use multiple input or output antennas, i.e. SIMO, MISO and MIMO radars.

As used in this application, the term "circuitry" may refer to one or more or all of the following:
 (a) hardware-only circuit implementations such as implementations in only analog and/or digital circuitry and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the disclosed technology has been illustrated by reference to specific embodiments, it will be apparent to those skilled in the art that the disclosed technology is not limited to the details of the foregoing illustrative embodiments, and that the disclosed technology may be embodied with various changes and modifications without departing from the scope thereof. The present embodiments are therefore to be considered in all respects as illustrative and not restrictive, the scope of the disclosed technology being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the disclosed technology are capable of operating according to the disclosed technology in other sequences, or in orientations different from the one(s) described or illustrated above.

What is claimed is:

1. An orthogonal frequency-division multiplexing (OFDM) based radar system, comprising:
    a transmit circuit configured to transmit an OFDM based radar signal comprising Q sub-carriers adapted to push an IQ-imbalance component out of a subset of L contiguous range bins of range profiles derived out of the received radar signal, wherein L is at most Q/2; and
    a receive circuit configured to receive a reflected radar signal based on the transmitted OFDM based radar signal, and
    a circuitry configured to perform an inverse Fourier transform to obtain the range profiles in a time domain (TD).

2. The OFDM based radar system of claim 1, wherein the range profiles are derived by any of zero-forcing, matched filter or mean minimum square error processing.

3. The OFDM based radar system of claim 1, wherein a Peak-to-Average Power Ratio, PAPR is at most two.

4. A radar device configured to generate a TD radar signal according to claim 1.

5. The radar device of claim 4, further configured to:
    provide a sequence of Q frequency domain (FD) OFDM subcarriers such that a Hadamard product of a) an inverse or complex conjugate transpose of a sequence of the Q sub-carriers represented in a FD sequence and b) a complex conjugate of the FD sequence wherein the order of subcarriers of the FD sequence is reversed, is orthogonal to the 2L-1 subcarriers centered around a direct current (DC) subcarrier of a Fourier transformation matrix indicative for the relation between a time domain (TD) and FD representation of the OFDM radar signal; and
    transform the sequence from the FD to the TD based on the Fourier transformation matrix, thereby obtaining the radar signal.

6. The radar device of claim 4, further configured to:
    receive the reflected radar signal;
    transform the received reflected radar signal to the FD thereby obtaining the Q subcarriers; and
    derive from the Q subcarriers a range profile with L contiguous range bins.

7. The radar device of claim 4, wherein the radar device is a multiple-input and multiple-output (MIMO) radar device.

8. An OFDM based radar system comprising:
    a transmit circuit configured to transmit an OFDM based radar signal comprising Q sub-carriers adapted to push an IQ-imbalance component out of a subset of L contiguous range bins of range profiles derived out of the received radar signal, wherein L is at most Q/2; and
    a receive circuit configured to receive a reflected radar signal based on the transmitted OFDM based radar signal, wherein a Hadamard product of:
    a) an inverse or complex conjugate transpose of a sequence of the Q sub-carriers represented in a frequency domain (FD) sequence and b) a complex conjugate of the FD sequence, wherein the order of subcarriers of the FD sequence is reversed,
    is orthogonal to 2L-1 subcarriers centered around a direct current (DC) subcarrier of a Fourier transformation matrix indicative of a relationship between a time domain (TD) and FD representation of the OFDM based radar signal.

9. The OFDM based radar system of claim 8, wherein L=Q/2 and wherein the Hadamard product corresponds to a sequence of a same complex scalar constant with alternating sign.

10. The OFDM based radar system of claim 8, wherein L=Q/2 and wherein the FD sequence corresponds to a complex scalar constant multiplied by an intermediate FD sequence where:
    the direct current, DC, subcarrier and a highest frequency subcarrier of the FD sequence are real;
    mirror subcarriers have equal magnitudes; and
    a sum of phases of mirror subcarriers is 180 degrees for odd subcarriers and 0 degrees for even subcarriers.

11. The OFDM based radar system of claim 10, wherein the positive subcarriers of the intermediate FD sequence have equal magnitudes.

12. The OFDM based radar system of claim 10, wherein the positive or negative subcarriers of the intermediate FD sequence correspond to a Golay sequence.

13. A method for generating the OFDM based radar signal, which comprises Q sub-carriers adapted to push an IQ-imbalance component out of a subset of L contiguous range bins of range profiles derived out of the received radar signal, wherein L is at most Q/2, the method comprising:
    providing a sequence of Q frequency domain (FD) OFDM subcarriers such that a Hadamard product of a) an inverse or complex conjugate transpose of a sequence of the Q sub-carriers represented in a FD sequence and b) a complex conjugate of the FD sequence wherein the order of subcarriers of the FD sequence is reversed, is orthogonal to the 2L-1 subcarriers centered around a direct current (DC) subcarrier of a Fourier transformation matrix indicative for the relation between a time domain (TD) and FD representation of the OFDM radar signal; and
    transforming the sequence from the FD to the TD based on the Fourier transformation matrix, thereby obtaining the radar signal.

14. The method of claim 13, wherein L=Q/2 and wherein the FD sequence corresponds to a complex scalar constant multiplied by an intermediate FD sequence fulfilling the following conditions:
    a) the DC subcarrier and a highest frequency subcarrier of the FD sequence are real;
    b) mirror subcarriers have equal magnitudes; and
    c) a sum of phases of the mirror subcarriers is 180 degrees for odd subcarriers and 0 degrees for even subcarriers.

15. The method of claim 14, further comprising:
    providing Golay sequences as candidates for the positive or negative subcarriers of the intermediate FD sequence; deriving therefrom candidate FD sequences by applying conditions b) and c); and selecting from the candidates a selected FD sequence with an optimal Peak-to-Average-Power Ratio (PAPR).

* * * * *